June 10, 1941. G. A. LOWREY Re. 21,824

APPARATUS FOR AND A METHOD OF CUTTING PIPE

Original Filed Aug. 22, 1936

Inventor

George A. Lowrey

By Edward V. Hardway

Attorney

Reissued June 10, 1941 Re. 21,824

UNITED STATES PATENT OFFICE 21,824

AN APPARATUS FOR AND A METHOD OF CUTTING PIPE

George A. Lowrey, Houston, Tex., assignor, by mesne assignments, to Sosthene Robichaux and George J. Barrett, both of Harris County, Tex.

Original No. 2,110,913, dated March 15, 1938, Serial No. 97,389, August 22, 1936. Application for reissue March 9, 1940, Serial No. 323,212

16 Claims. (Cl. 164—0.8)

This invention relates to a pipe cutter and has particular relation to a novel type of cutter for removing a section of pipe in a well bore preparatory to side tracking the lower end of the bore or to producing from the exposed stratum of the formation, if productive.

In carrying on well drilling operations the well bore, at times, becomes obstructed or it may become inclined to such an extent that it is necessary to side track the lower end of the bore in order to straighten it. In either of said events it is common practice to lower a whip stock into the well casing and anchor it therein above the obstruction or at the point where the bore is to be straightened, for use in connection with a milling tool to mill out the side of the casing so as to form a window or opening through which subsequent drilling operations may be carried on. This is a rather difficult and uncertain operation and it is one of the objects of this invention to provide a reaming cutter whereby a section of the well pipe may be completely removed without the use of a whipstock, which may then be set in the upper end of the lower section remaining in the bore with its tapering face opposite the cut out portion of the pipe for side tracking the drilling tool while carrying on the subsequent drilling operations.

In case the section of pipe removed is opposite a producing stratum a well screen may then be set opposite said stratum and oil produced therefrom in the usual way, no side tracking operation in such case being necessary, or other operations carried on through the space thus left.

It is a further object of the invention to provide a novel method for removing pipe from a well.

With the above and other objects in view the invention has particular relation to certain novel features of construction, operation and arrangement of parts, an example of which is given in this specification and illustrated in the accompanying drawing, wherein.

Figure 1:
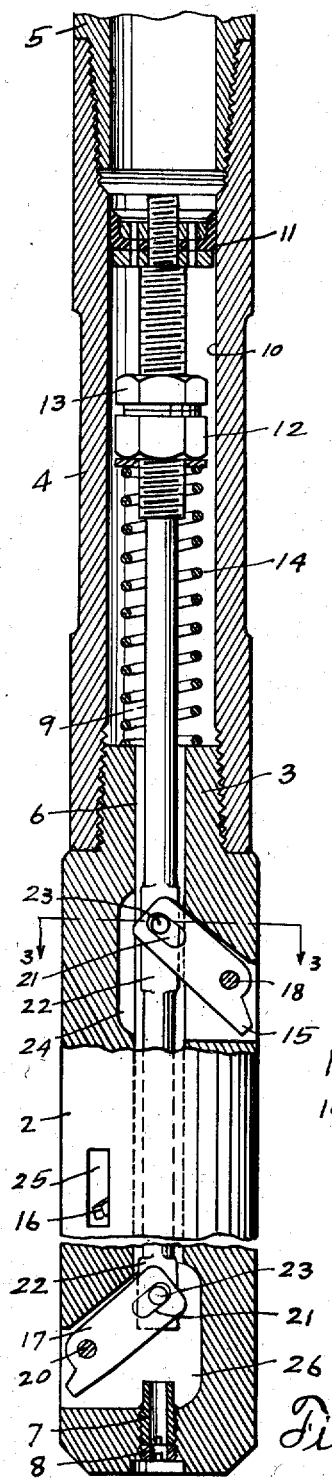
Figure 1 shows a side view of the reaming cutter employed shown partly in section.

Referring now more particularly to the drawing wherein like numerals of reference designate similar parts in each of the figures, the numeral 1 designates a well casing showing an intermediate section thereof cut away in the well and showing the reaming and cutting tool at work therein.

The numeral 2 designates the cutter head which is preferably cylindrical in form and whose upper end is formed with the outwardly threaded reduced pin 3 onto which the lower end of the elongated tubular collar 4 is threaded. A tubular operating string 5 is connected to the upper end of the collar 4. The head 2 has an axial bore 6 whose lower end is reduced and threaded into said reduced lower end there is a tubular stop 7 which extends up above the reduced end of the bore and which is secured in place by an annular lock nut 8 which is threaded into the lower end of the bore and abuts said stop.

Working through the bore 6 there is an actuating rod 9 which extends up into the cylinder 10 formed by the collar 4. On the upper end of this rod there is a plunger 11 which works in the cylinder 10. A stop member 12 is threaded onto the rod 9 and may be locked thereon at any desired point of adjustment by the lock nut 13 also threaded onto the rod. A coil spring 14 surrounds the rod 9 and is interposed between the stop 12 and the upper end of the head 2 and normally holds the plunger and rod elevated and the reaming and cutting blades, hereinafter referred to, retracted.

There are the pairs of upper, intermediate and lower cutting and reaming blades, indicated respectively by the numerals 15, 16 and 17. These blades are pivoted near their outer ends in the head to work on the respective cross-pins 18, 19 and 20. The inner ends of the blades have the elongated slots as 21 and said inner ends work against the flat side faces as 22 formed on the rod 9 and projecting outwardly from these respective side faces are the studs 23 which work through the slots 21. The outer ends of the blades terminate in outwardly directed bits to cut into the pipe, as shown in Figure 3, and the blades also have the downwardly directed cutting edges to operate on the upper end of the section of the pipe beneath, as shown in Figure 2.

Figure 2:
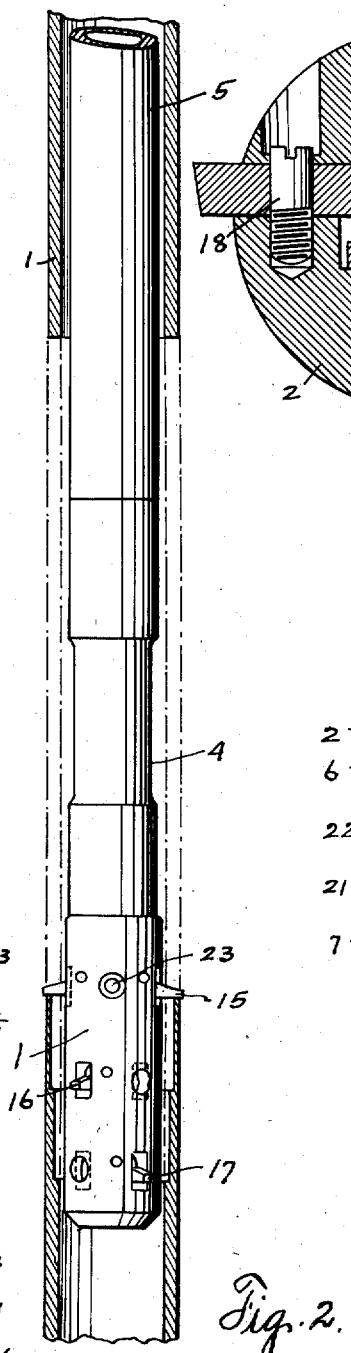
Figure 2 shows a side view thereof as applied to the work.
Figure 3:
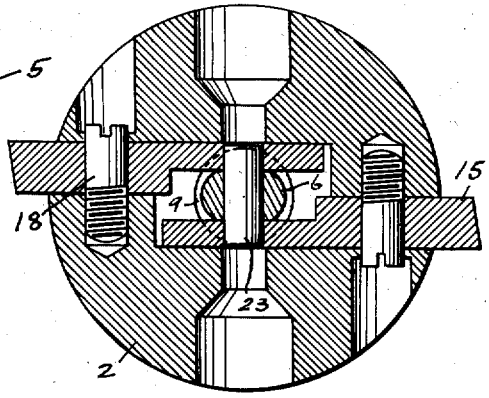
Figure 3 shows a transverse sectional view taken on the line 3—3 of Figure 1.
Figure 4:
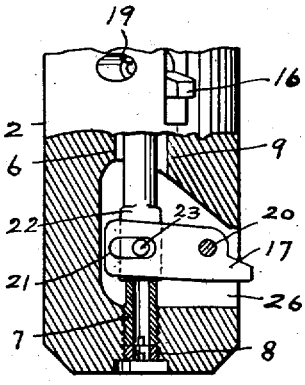
Figure 4 shows a fragmentary vertical sectional view of the lower end of the tool.

Each pair of blades when in outer or working position projects out further than the pair of blades immediately beneath so that the upper cutting and reaming blades will cut entirely through the pipe but those beneath will act as reaming blades as clearly indicated in Figure 2.

In use the tool is lowered into the well to the desired point. The operating string 5 extends to the ground surface and liquid under pump pressure is forced down through said string and gradually moves the plunger and plunger rod downwardly while the tool is rotated. The outer or cutting ends of the upper blades 15 will be forced into contact with and will cut entirely through the pipe and the intermediate blades 16 will be projected out and are of a length to cut about two-thirds of the way through while the lower blades 17 will penetrate the pipe or casing about one-third of the way through.

When the upper blades have cut entirely through the pipe the cutting and reaming tool may then be gradually lowered and all or a portion of the weight of the operating string imposed thereon so that an entire section of the pipe will be cut away as indicated in Figure 2 and the cutting operation may be continued until the required amount of pipe has been cut out leaving a corresponding amount of open hole.

It will be noted that when the cutting and reaming blades have reached the limit of their outward movement the lower end of the rod 9 will contact the upper end of the stop 7. Inside cavities 24, 25 and 26 are formed in the head 1 to give sufficient clearance for the blades to permit them to properly operate.

When a sufficient amount of casing has been cut away to give the required amount of open hole the cutting tool may be withdrawn from the bore, and if it is desired to side track, a whipstock may be lowered into the casing and anchored in the upper end of the lower cut off section of the casing and a side tracking tool attached to the lower end of the drill stem and lowered into the hole and deflected by the whipstock, in the usual way in side tracking the original bore; or, if the cut away portion of the casing is opposite producing stratum a screen may be set in the usual way and production thus obtained.

The drawing and description are illustrative merely, while the broad principle of the invention will be defined by the appended claims.

What I claim is:

1. A tool for removing a section of casing in a well bore comprising a cutter head, a cylinder above the cutter head, an operating string attached to the upper end of the tool, an actuating rod vertically reciprocable through the head, a plunger on the rod in the cylinder, yieldable means normally holding the rod and plunger elevated, series of cutters pivotally mounted in the head and whose inner ends are operatively connected with the rod whereby upon downward movement of the rod the cutters will be projected outwardly from the head into cutting relation with the casing, the upper cutters being of a length to project out further than the cutters beneath.

2. A tool for removing a section of casing in a well bore comprising a cutter head, upper, intermediate and lower cutters on the head, means arranged to be actuated by fluid under pressure to move the cutters into outer or active position, said cutters, when in active position, extending out at unequal distances from the head and means for retracting the cutters upon relief of the fluid pressure.

3. A tool for removing a section of casing in a well bore comprising a cutter head, upper, intermediate and lower cutters on the head, means arranged to be actuated by fluid under pressure to move the cutters into outer or active position, said cutters, when in active position, extending out at unequal distances from the head, means for retracting the cutters upon relief of the fluid pressure, and stop means for limiting the movement of the cutters toward active position.

4. A tool for cutting out a section of casing in a well bore comprising a cutter head, a tubular operating string to which the head is attached, upper and lower cutters mounted on the head and movable outwardly into active position in cutting relation with the casing and into inward or retracted position, said cutters, when in active position, extending out at unequal distances from the head and means for actuating said cutters into either of said positions.

5. A tool for removing a section of pipe in a well bore comprising a cutter head adapted to be connected to an operating string, an outwardly movable cutter thereon terminating in an outwardly directed bit, means for moving the cutter outwardly whereby the bit will penetrate and sever the pipe upon rotation of the tool, said cutter having a downwardly directed cutting edge arranged to operate on the upper end of the lower severed portion of the pipe and effective to completely cut away and remove a section of said lower portion and to leave the corresponding portion of the bore formation exposed and means within the tool for holding the cutter in position to support the weight of the string thus maintaining said edge in cutting relation with said upper end upon subsequent rotation and downward movement of the tool.

6. A tool for removing a section of pipe in a well bore comprising a cutter support adapted to be connected to an operating string, an outwardly movable cutter thereon whose outer end terminates in an outwardly directed bit, means for moving the cutter outwardly into active position whereby the bit will penetrate and sever the pipe upon rotation of the tool, said cutter having a downwardly directed cutting edge arranged to operate on the upper end of the lower severed portion of the pipe and effective to completely cut away and remove a section of said lower portion, said string being arranged to rest on the cutter, when the cutter is in active position, to hold said cutting edge in cutting relation with said upper end throughout the subsequent downward movement and rotation of the tool whereby an appreciable section of said lower portion will be removed.

7. A tool for removing a section of pipe in a well bore comprising a cutter support, an outwardly movable cutter thereon whose outer end terminates in an outwardly directed bit, means for moving the cutter outwardly into active position whereby the bit will penetrate and sever the pipe upon rotation of the tool, said cutter having a downwardly directed cutting edge arranged to operate on the upper end of the lower severed portion of the pipe and effective to completely cut away and remove a section of said lower portion, means for rotating the tool and moving it downwardly, the weight of said rotating means being imposed on the cutter when the cutter is in active position and forming means for maintaining said cutting edge in cutting relation with said upper end throughout said rotation and downward movement of the tool.

8. A tool for removing a longitudinal section of pipe in a well bore comprising a support, cutting means thereon movable into active position or into retracted position, said cutting means when at the limit of its active position extending through said pipe, said cutting means having a downwardly directed cutting edge adapted, when in active position, to operate on the upper end of the lower severed portion of the pipe and effective to completely cut away and remove a longitudinal section of said lower portion and leave the corresponding portion of the bore formation exposed all the way around, means for actuating said cutting means into either of said positions, means for rotating the tool and moving it downwardly, said rotating means being so connected to the cutter that when the cutter is in active position the weight of the string will maintain the cutting edge in cutting relation with said upper end, after the pipe is severed and during the subsequent rotation and downward movement of the tool.

9. A tool for removing a sufficiently long section of pipe in a well bore to permit sidetracking operations to be carried on through the space left after such removal and comprising a cutter support shaped to enter the pipe, an outwardly movable cutter on the support of a length to extend to the outside of the pipe when the cutter is moved to the limit of its outward movement, said cutter having a downwardly directed cutting edge, means for moving the cutter outwardly, means for rotating the cutter support and cutter, operative connections between the cutter moving means and the cutter supporting means whereby the weight of the cutter rotating means will be imposed on the cutter when the cutter is moved outwardly and said cutting edge will be maintained in cutting relation with the upper end of the pipe beneath the cutter solely by the weight of the cutter rotating means.

10. A tool for removing a sufficiently long section of pipe in a well bore to permit subsequent operations to be carried on through the space left after such removal and comprising a cutter support shaped to enter the pipe, an outwardly movable cutter on the support of a length to extend to the outside of the pipe when the cutter is moved to the limit of its outward movement, said cutter having a downwardly directed cutting edge, means for moving the cutter outwardly, means for rotating the cutter support and cutter, operative connections between the cutter moving means and the cutter supporting means whereby said cutting edge will be maintained in cutting relation with the upper end of the pipe beneath the cutter by the weight of the cutter rotating means.

11. A tool for removing a sufficiently long section of pipe in a well bore to permit subsequent operations to be carried on through the space left after such removal and comprising a cutter support shaped to enter said pipe, an operating string to which the support is attached, an outwardly movable cutter on the support of a length to extend to the outside of the pipe when the cutter is moved to the limit of its outward movement, said cutter having a downwardly directed cutting edge to operate on the upper end of the section of pipe beneath, said operating string being so related to the cutter, when the cutter is in said outer position, that the weight of the string will be imposed on the cutter inwardly of the pipe and the pipe and string will co-act to hold the cutting edge against the work during the subsequent rotation and downward movement of the tool.

12. A tool for removing a sufficiently long section of pipe in a well bore to permit subsequent operations to be carried on through the space left after such removal and comprising a cutter support shaped to enter said pipe and adapted to be connected to an operating string, a pivot in the support, a cutter oscillatably mounted on the pivot of a length to extend to the outside of the pipe when the cutter is rotated to active position, said cutter having a downwardly directed cutting edge to operate on the upper end of the section of pipe beneath being cut, stop means arranged to limit rotation of the cutter on the pivot, said pivot, stop means and cutter being arranged so that the cutter will be held in said active position by the upper end of said pipe beneath being cut during the cutting operation.

13. A tool for removing a sufficiently long section of pipe in a well bore to permit subsequent operations to be carried on through the space left after such removal and comprising a cutter support adapted to be connected to an operating string and shaped to enter said pipe, an oscillatable cutter on the support of a length to extend to the outside of the pipe when the cutter is rotated to active postiion, said cutter having a downwardly directed cutting edge to operate on the upper end of the section of pipe beneath being cut, stop means to limit rotation of the cutter, said cutter and stop means being arranged so that the cutter will be held in active position by the upper end of said pipe beneath being cut in cooperation with the weight of the operating string.

14. A tool for removing a sufficiently long section of pipe in a well bore to permit subsequent operations to be carried on through the space left after such removal and comprising a cutter support shaped to enter said pipe, an operating string to which the support is attached, an outwardly movable cutter on the support of a length to extend to the outside of the pipe when the cutter is moved to the limit of its outward movement, said cutter having an outwardly directed bit adapted to sever the pipe, upon outward movement of the cutter and rotation of the body, and also having a downwardly directed cutting edge to operate on the upper end of the severed section of pipe beneath, said operating string being related to the cutter so that when said cutter is at the limit of its outward movement the weight of the string will be imposed on the cutter inwardly of the pipe and the string and severed section of pipe beneath will co-act to hold the cutting edge against the work during the subsequent rotation and downward movement of the tool.

15. The method of removing a sufficiently long section of pipe in a well to permit subsequent operations to be carried on through the space left after such removal, which method consists in lowering a cutting tool on an operating string into the well, actuating the tool to bring the cutter thereof into cutting relation with the upper end of the section of pipe beneath, imposing the weight of the string on the cutter and rotating said string and tool with said cutter on the upper end of the section to be removed and with said weight on the cutter, until said section is removed.

16. The method of removing a sufficiently long section of pipe in a well to permit subsequent operations to be carried on through the space left after such removal, which method consists in lowering a cutting tool, having a cutter, on an operating string into the well, actuating the tool to move the cutter outwardly into contact with the pipe to be cut, rotating the tool to sever the pipe, imposing the weight of the string on the cutter and rotating said string and tool with said cutter on the upper end of the section being removed and with said weight on the cutter, until said section is removed.

GEORGE A. LOWREY.